United States Patent [19]

Ponzo

[11] Patent Number: 4,587,758
[45] Date of Patent: May 13, 1986

[54] CRAB TRAP

[76] Inventor: Charles Ponzo, 37 Abby La., Shirley, N.Y. 11967

[21] Appl. No.: 631,332

[22] Filed: Jul. 16, 1984

[51] Int. Cl.⁴ ............................................. A01K 71/00
[52] U.S. Cl. ....................................... 43/102; 43/100; 43/105
[58] Field of Search ................. 43/7, 10, 12, 100, 101, 43/102, 103, 104, 105

[56] References Cited

U.S. PATENT DOCUMENTS

| 1,143,759 | 6/1915 | Franklin | 43/12 |
| 1,832,178 | 11/1931 | Billings | 43/12 |
| 2,489,856 | 11/1949 | Buford | 43/102 |
| 3,494,064 | 2/1970 | Stein | 43/102 X |
| 4,134,226 | 1/1979 | Petrella | 43/102 |
| 4,445,295 | 5/1984 | Litrico | 43/102 |

Primary Examiner—Nicholas P. Godici
Assistant Examiner—M. Jordan
Attorney, Agent, or Firm—Michael I. Kroll

[57] ABSTRACT

A crab trap with a buoyancy upper cover and a sinking lower surface. When the crab trap is lowered into the water the lower surface sinks to the bottom and the top cover opens to a pre-determined point. When the trap is retrieved, the bundled hoist lines are pulled through holes in the top cover and the lower surface thereby closing the trap and trapping the crabs. The trap may be rectangular, square or circular in outline and the top cover may be solid or perforated.

6 Claims, 4 Drawing Figures

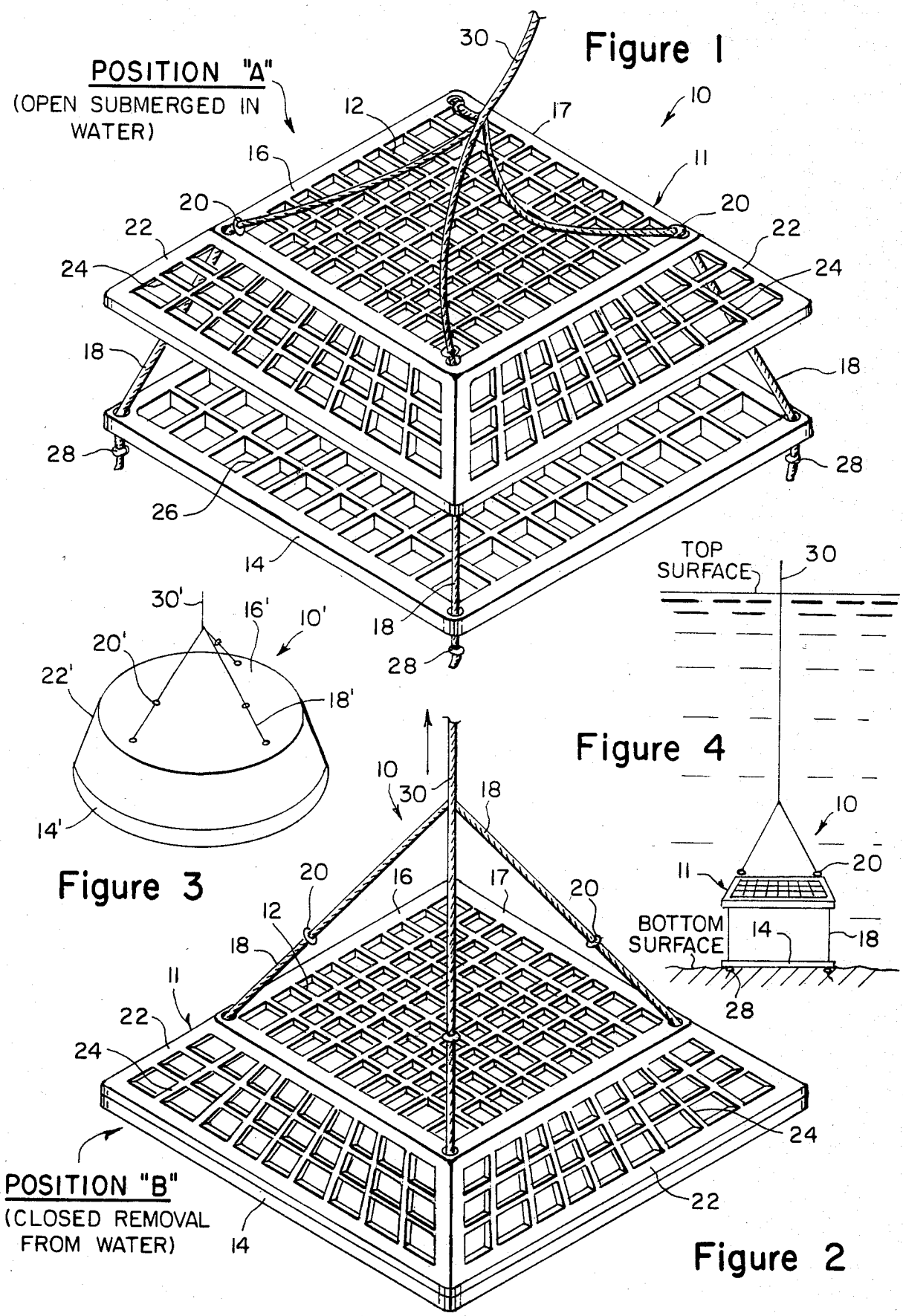

CRAB TRAP

BACKGROUND OF THE INVENTION

1. Field of the Invention

The present invention relates generally to sporting and fishing equipment and, more specifically, to traps for the capture of crustaceans, particularly crabs.

2. Description of the Prior Art

At the present state of the art crab traps are expensive, difficult to use and difficult to place and locate. Existing crab traps often allow captured crabs to escape.

SUMMARY OF THE INVENTION

It is, therefore, a primary object of the present invention to provide a crab trap which is simple to fabricate.

Another object is to provide a crab trap which is inexpensive to fabricate.

A yet further object is to provide a crab trap in which a bottom perforated surface which is more dense than water sinks to the bottom of the bay or inlet.

A yet further object is to provide a crab trap in which a top section, which may be perforated or solid which is buoyant and automatically opens when submerged in water.

A still further object is to provide a crab trap which uses hoist lines to lower the trap and raise the trap in such a manner that when the trap is raised to the surface the crabs are automatically imprisoned and cannot escape regardless of their thrashing about.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the invention in its open position.

FIG. 2 is a perspective view of the invention shown in FIG. 1 in its closed position.

FIG. 3 is a perspective view of a round embodiment of the invention.

FIG. 4 is a perspective view of the invention is its open position.

DETAILED DESCRIPTION OF THE PREFERRED EMBODIMENTS

In FIGS. 1 and 2, the invention 10 consists of two major parts, a buoyant enclosure or top cover 11 and a lower perforated surface 14. Top cover 11 is in the shaped of a truncated pyramid with four sloping trapezoidal sides 22 and a square top surface 16. Typical grid like perforations 12, 24 and 26 may be seen. The four hoist lines 18 begin as a bundle at 30 after which they diverge and pass through four apertures in the corners of continuous flange 17. The downwards travel of four hoist lines 18 is limited by four top stop members 20. Hoist lines 18 pass through four corresponding openings in lower perforated surface 14 and are secured by four bottom stop members 28. When the invention 10 is placed in the water lower perforated surface 14 descends to the floor of the body of water by pulling hoist lines 18 through openings in continuous flange 17. When the invention 10 is retrieved by pulling on bundled hoist line 30 lower perforated surface 14 is raised until it closes onto top perforated cover 11 trapping the crabs.

Section 14 is heavier than water and therefore will sink and remain on the bottom of the water. Member 16 is buoyant so that it will float and will automatically open to the position shown in FIG. 1 and its opening will be limited by stop members 20. Importantly, invention 10 is heavier than water so it sinks; member 14 is heavier than water so it will remain on the bottom of the water; and, member 11 is lighter than water so that it floats open to the extent of stop member 20.

In FIG. 3, a round crab trap 10' with solid cover 16' with sloping conical surface 22' is shown resting upon bottom surface 14'. Bundled hoist line 30' is shown diverging into three hoist lines 18' and limited by top stop member 20'.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A crab trap comprising in combination:
   (a) a lower perforated surface having corners with apertures and being heavier than water;
   (b) a one piece perforated buoyant enclosure having corners with apertures and being positioned above said lower surface; and
   (c) a plurality of hoist lines having lower extremities with integral top and bottom stop members, said plurality of hoist lines being first bundled together and then diverging through said apertures in said corners of said one piece perforated buoyant enclosure and thereafter passing through said corresponding apertures in said corners of said lower perforated surface, said plurality of hoist lines being secured by said bottom stop members disposed at said lower extremities of each of said plurality of hoist lines and being below said lower perforated surface and said top stop members disposed on said plurality of hoist lines above said one piece perforated buoyant enclosure, said top stop members limiting travel of said one piece perforated buoyant enclosure and both of said top and bottom stop members allowing said lower perforated surface and said one piece perforated buoyant enclosure to be easily raised and lowered, so that when the crab trap is lowered into water the weight of said lower perforated surface pulls said plurality of hoist lines through said apertures in said corners of said one piece perforated buoyant enclosure which floats while said lower perforated surface sinks and recovery of the crab trap along with captured crabs is achieved by pulling on said bundled hoist lines and raising said lower perforated surface until it meets said one piece perforated buoyant enclosure and prevents the escape of captured crabs.

2. A crab trap, as recited in claim 1, wherein said lower surface is a rectangular plate with a central perpendicular grid work.

3. A crab trap, as recited in claim 1, wherein said lower surface is a square plate with a central perpendicular grid work.

4. A crab trap, as recited in claim 1, wherein said buoyant enclosure is in the shape of a truncated pyramid wherein the four trapezoidal sloping surfaces and the flat top square surface comprise four trapezoidal borders with perpendicular grid work and a top square border with perpendicular grid work.

5. A crab trap, as recited in claim 1, wherein said buoyant enclosure is in the shape of a truncated cone with solid outer periphery and solid circular top.

6. A crab trap, as recited in claim 1, further comprising top members attached to each of said multiplicity of hoist lines between the point at which said bundled hoist lines diverge and said orifices in said top cover thereby preventing the downward force on said hoist lines caused by a descending lower perforated surface from crimping said hoist lines.

* * * * *